US012754050B2

(12) United States Patent
Caoduro et al.

(10) Patent No.: US 12,754,050 B2
(45) Date of Patent: Oct. 6, 2026

(54) DEVICE FOR MEASURING A FLUID

(71) Applicant: PIETRO FIORENTINI S.p.A., Arcugnano (IT)

(72) Inventors: Nicola Caoduro, Arcugnano (IT); Nevio Zampieri, Montegalda (IT)

(73) Assignee: PIETRO FIORENTINI S.p.A., Arcugnano (IT)

( * ) Notice: Subject to any disclaimer, the term of this patent is extended or adjusted under 35 U.S.C. 154(b) by 300 days.

(21) Appl. No.: 18/681,086

(22) PCT Filed: Aug. 4, 2022

(86) PCT No.: PCT/IB2022/057265
§ 371 (c)(1),
(2) Date: Feb. 5, 2024

(87) PCT Pub. No.: WO2023/012720
PCT Pub. Date: Feb. 9, 2023

(65) Prior Publication Data

US 2024/0369390 A1 Nov. 7, 2024

(30) Foreign Application Priority Data

Aug. 6, 2021 (IT) ........................ 102021000021431

(51) Int. Cl.
*G01F 1/66* (2022.01)

(52) U.S. Cl.
CPC .................................... *G01F 1/662* (2013.01)

(58) Field of Classification Search
CPC . G01F 1/662; G01F 1/40; G01F 1/667; G01F 1/684; G01F 1/692; G01F 1/7084; G01F 1/7086; G01F 15/00; G01F 1/7082
(Continued)

(56) References Cited

U.S. PATENT DOCUMENTS 4,140,012 A 2/1979 Hendriks
11,609,226 B2 * 3/2023 Nesa .................. G01N 33/4972
(Continued)

FOREIGN PATENT DOCUMENTS

DE 102015219509 A1 * 4/2017 ............. G01D 21/02
EP 2146189 A1 1/2010
(Continued)

*Primary Examiner* — Marrit Eyassu
(74) *Attorney, Agent, or Firm* — Carmel Patent Agency; Robert Ballarini

(57) ABSTRACT

A device for measuring the flow rate of gas or liquid circulating within a pipe and the device includes: a containment structure with a first opening for the inlet of the fluid and a second opening for the outlet of the fluid. The containment structure defining inside it a path for the fluid between the first and second openings. The path includes an internal tubular section developing in a substantially rectilinear way along a longitudinal axis and which is in fluid communication with the first or second openings. At least one external chamber is positioned around the tubular section and is in fluid communication with the second opening or with the first opening. The at least one external chamber is fluidly connected with the internal tubular section. The device also includes sensor means configured to detect a quantity of the flow of fluid that passes through the internal tubular section.

17 Claims, 8 Drawing Sheets

(58) Field of Classification Search
USPC ........................................................ 73/861.18
See application file for complete search history.

(56) References Cited

U.S. PATENT DOCUMENTS

| | | | | |
|---|---|---|---|---|
| 2012/0231481 | A1 | 9/2012 | Hsu et al. | |
| 2016/0282164 | A1 | 9/2016 | Derevyagin | |
| 2019/0212180 | A1 * | 7/2019 | Stetsenko | G01F 15/00 |

FOREIGN PATENT DOCUMENTS

| | | | | | |
|---|---|---|---|---|---|
| EP | 2146189 | B1 | * | 10/2015 | G01F 1/662 |
| EP | 3296704 | A1 | | 3/2018 | |
| FR | 2238917 | A1 | | 2/1975 | |
| IT | 201800003959 | A1 | * | 9/2019 | G01F 15/07 |
| WO | 2018185034 | A1 | | 10/2018 | |

* cited by examiner

FIG. 13
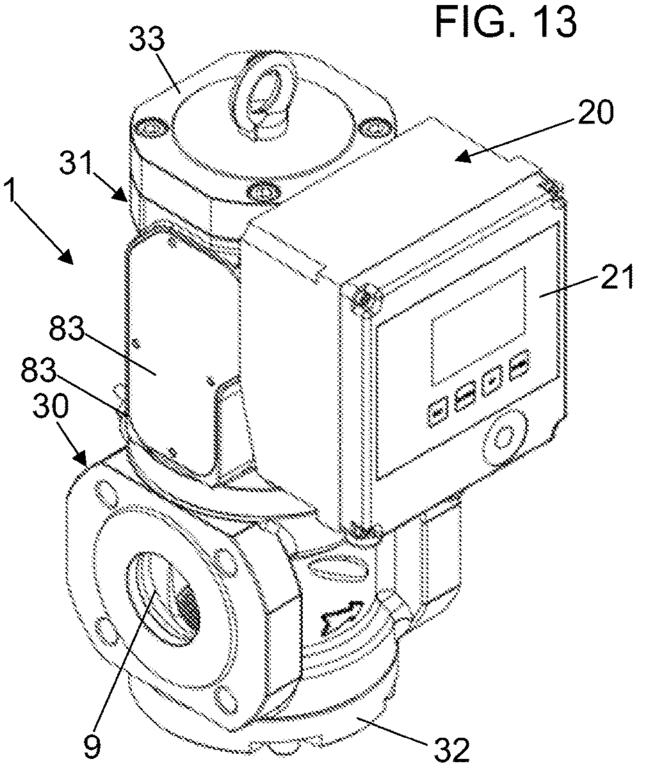
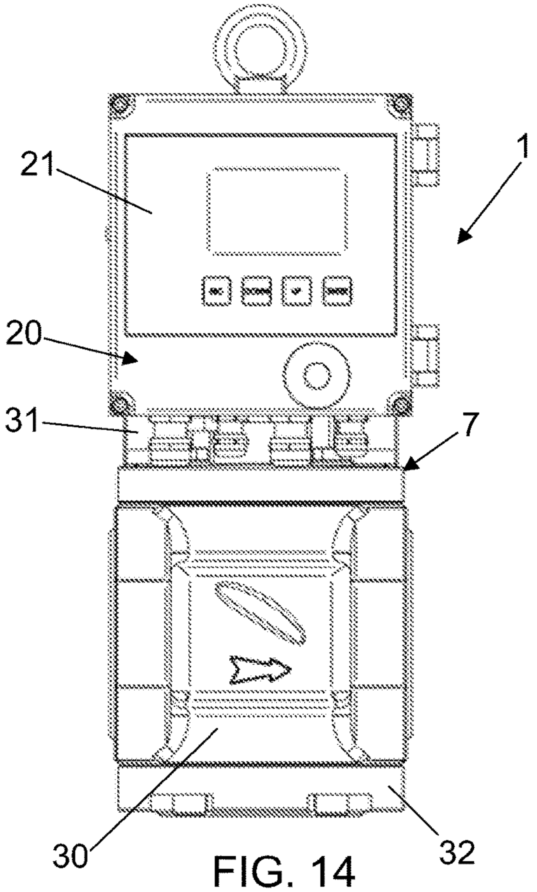
FIG. 14
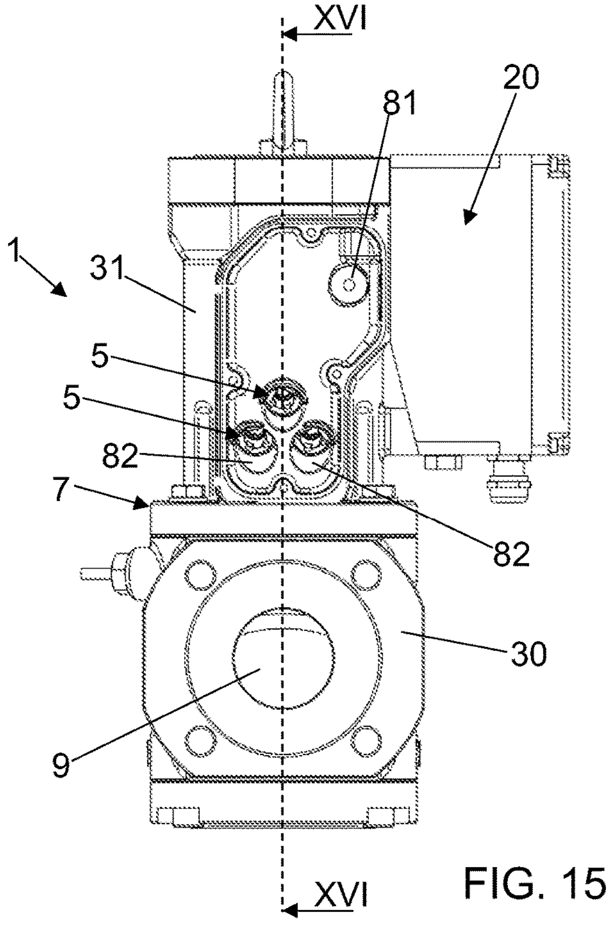
FIG. 15

DEVICE FOR MEASURING A FLUID

FIELD OF THE TECHNIQUE

The present invention relates to a device for measuring a fluid, preferably a gas, and in particular of the type suitable for measuring the flow of gas or a liquid present and circulating inside of a pipeline, such as for example a pipeline of the distribution network of natural gas or other gases produced in a decentralized way, such as biomethane or hydrogen. Therefore, the invention finds advantageous use in the technical sector of the production and marketing of apparatus and devices for measuring fluids, in particular gas, and is advantageously applicable in plants for the transport and distribution of gas (in particular natural gas, or hydrogen and/or hydrogen/natural gas mixtures, or other decentralized gases, such as biomethane).

In these plants, the measuring devices, in particular the gas flow rate, are used to measure and/or monitor and count the gas consumption.

Conveniently, the device according to the invention can be used to measure the flow of a liquid, for example of water.

BACKGROUND OF THE INVENTION

Many types of measuring devices are known in the reference technical sector and among these there are ultrasonic, turbine, rotary and calibrated orifice devices.

In particular, the known devices for measuring gas are equipped with a passage tube, which is configured to allow the passage of the gas to be measured, and comprise at least one sensor associated with the passage tube for measuring and detecting quantities of the gas itself.

The devices for measuring gas, and in particular for measuring the flow rate, are generally classified on the basis of their nominal internal diameter, ie the nominal diameter of the pipe in which the device will be installed, known in the technical jargon of the sector with the acronym "DN".

As is known, each type of measuring device requires a corresponding length of straight sections of pipe provided before and after the device itself, and this in order to ensure homogeneity of the flow inside the pipe and thus ensure optimal accuracy. measurement independently of the flow conditions that may arise before and after the device, for example due to curves in the pipeline or due to changes in the section of the pipeline itself.

In particular, this need is foreseen in the reference regulations typically applied, such as MID (Directive 2014/32/EU) and OIML R137.

Generally, the length of the straight sections to be provided before and after the measuring device is catalogued as a multiple of the aforementioned nominal internal diameter DN.

Typically, the length used in the aforementioned devices for measuring the natural gas flow rate in the distribution networks is 10DN before (ie upstream) of the device and 5DN after (ie downstream) of the device itself. These lengths of the straight sections are very significant in terms of overall dimensions within a gas transport network and, therefore, are normally used in applications where the spaces and the configuration of the lines themselves allow it.

Furthermore, the aforesaid lengths of the straight sections are used for applications in which, given the large flow rates and corresponding large volumes of transported gas, a measurement accuracy of even less than 0.5% is required. More in detail, such high accuracy is possible only with a perfect distribution of the flow inside the pipeline, which is now guaranteed by the aforementioned straight sections, possibly and usually associated with specific flow conditioners, ie inserts installed at the inside the pipe in order to evenly distribute the flow inside the pipe itself.

It is therefore evident that known gas measuring devices have proved to be not free from drawbacks in practice and, in particular, are not suitable for installation in gas distribution networks, in particular in correspondence with final reduction units (also known as "GRF"), when it is considered that the requests for accuracy of the measurement are not as stringent as those required for transport networks.

The main drawback lies in the fact that known devices require long straight sections of upstream and downstream piping in order to be installed, which sections are not always available in the distribution networks and, in particular in correspondence with the final reduction units (also known as "GRF"), thus inevitably requiring a change to the geometry of the distribution unit.

A further drawback lies in the fact that, where the geometry of the distribution network does not allow the installation of the known type device and where there is not even the possibility of changing it (think for example of an underground distribution network that develops in proximity to the of concrete constructions that constrain their geometry), it is necessary to renounce the installation of the device in order to search for a section of the network in which such installation is possible.

EP2146189 describes an ultrasonic measuring device consisting of a first piece with two flanges, for connection respectively to an upstream and downstream section of pipe, and of a second double-pipe piece with an external wall and an internal wall which define an external annular inflow zone from an internal cylindrical outflow zone. In the connecting section between the first piece and the second piece there is an arched wall which diverts the flow entering the device, and also diverts the flow leaving the device. The ultrasonic measurement area, with the ultrasonic transducers, is provided in the terminal part of the internal cylindrical outflow area, immediately upstream of the section in which the outgoing flow is diverted from the arched wall.

U.S. Pat. No. 4,140,012 describes an ultrasonic flowmeter consisting of a rectangular housing body made in a single piece and provided with two opposite ends and also with two opposite openings, respectively for the inlet and outlet of the fluid to be measured. An internal tube is mounted inside the housing body which is supported by an unperforated wall, inclined by 45° with respect to the tube itself, which defines two zones which are connected respectively with the inlet opening and with the opening of outlet and which are in communication with each other only through the passage defined inside the inner tube. The ultrasonic sensors are mounted at said two ends of the housing body, thus being mounted respectively upstream and downstream with respect to the passage defined by the inner tube and thus transmitting ultrasonic signals which are directed along the direction of axial development of said inner tube.

EP3296704 describes a flow meter comprising a connection base with openings for the fluid inlet and outlet respectively, an external housing cap and a traditional flow sensor which are mounted, separately and independently from each other, on the connection base. The inlet opening communicates with an external annular chamber defined between the cap and the external walls of the tubular section, while the outlet opening communicates with an internal tubular chamber which is defined inside the flow sensor. The fluid flow entering the inlet opening first rises through the entire external annular chamber, then descends through the entire internal tubular chamber, and then exits through the outlet opening.

US2016/282164 describes a solution for measuring the flow rate of a fluid through a duct. In particular, the solution provides for the use of a unit to divert the flow which consists of a sealed tank having an inlet portion connected to the inlet duct, an outlet portion connected to the outlet duct, and a deviation portion comprising an internal tubular element provided with flow sensor means and a section being also provided for connecting the tubular element to the outlet duct.

OBJECTS OF THE INVENTION

The object of the invention is to propose a device for measuring gas which allows to overcome, at least in part, the aforesaid drawbacks present in the solutions of the aforementioned prior art.

Another object of the invention is to propose a device that can be installed in any section of a gas distribution network, in particular in correspondence with a final reduction unit.

Another object of the invention is to propose a device which obviates the need to modify the geometry of the distribution network for its installation.

Another object of the invention is to propose a device that satisfies the regulatory requirements for the accuracy of the measurement, in particular of the gas flow rate.

Another object of the invention is to propose a device which is structurally and functionally completely reliable.

Another object of the invention is to propose a device which is an improvement and/or alternative to the traditional ones.

Another object of the invention is to propose a device which has high safety and operability standards.

Another object of the invention is to propose a device which can be manufactured simply, quickly and at low costs.

Another object of the invention is to propose a device whose maintenance can be carried out simply, quickly and at low costs.

Another object of the invention is to propose a device which can be assembled in a simple and rapid way.

Another object of the invention is to propose a device which has an alternative characterization, both in constructive and functional terms, with respect to traditional ones.

SUMMARY OF THE INVENTION

All the purposes mentioned herein, considered both individually and in any combination thereof, and others that will result from the following description are achieved, according to the invention, with a device as defined in claim 1.

DESCRIPTION OF THE FIGURES

The invention is further clarified hereinafter in some of its preferred embodiments reported for purely illustrative and non-limiting purposes with reference to the attached drawing table, in which:

FIG. 13 shows a perspective view of a third embodiment of the device for measuring gas according to the invention, FIG. 14 shows the device of FIG. 13, FIG. 15 shows the device of FIG. 13 according to a different front view, and with the element covering the seats of the sensor means removed.

DETAILED DESCRIPTION OF THE INVENTION AND OF SOME OF ITS PREFERRED EMBODIMENTS

Figure 1:
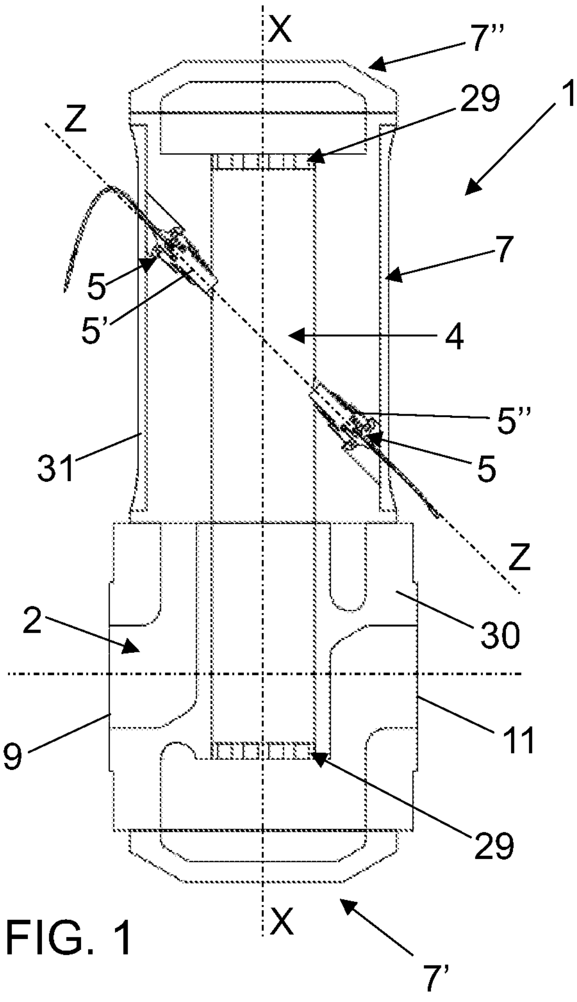
FIG. 1 shows a front view in longitudinal section of the device for measuring of the gas according to the invention.
Figure 2:
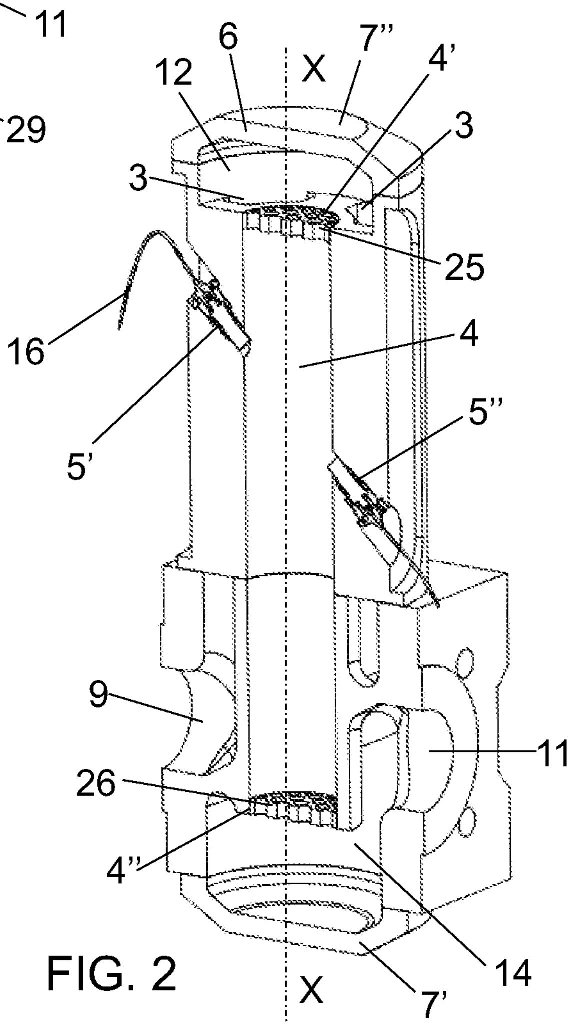
FIG. 2 shows a front perspective view in longitudinal section of the device.
Figure 3:
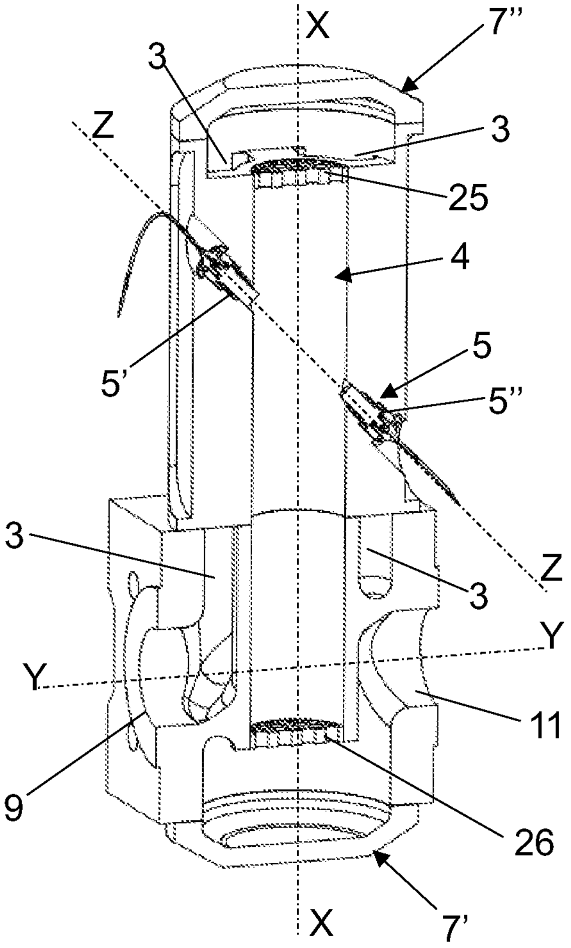
FIG. 3 shows a second front perspective view in longitudinal section of the device.
Figure 4:
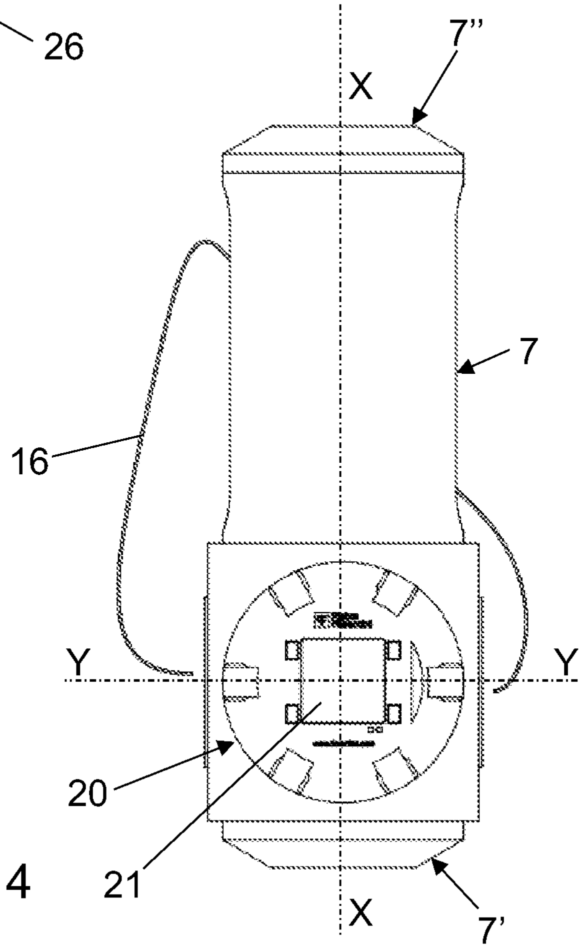
FIG. 4 shows a side view of the device.
Figure 5:
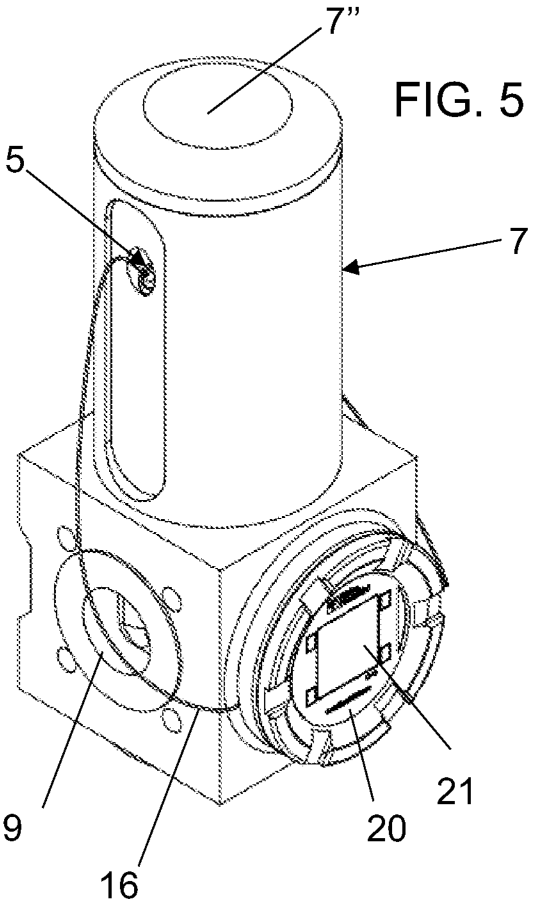
FIG. 5 shows a side perspective view of the device.
Figure 6:
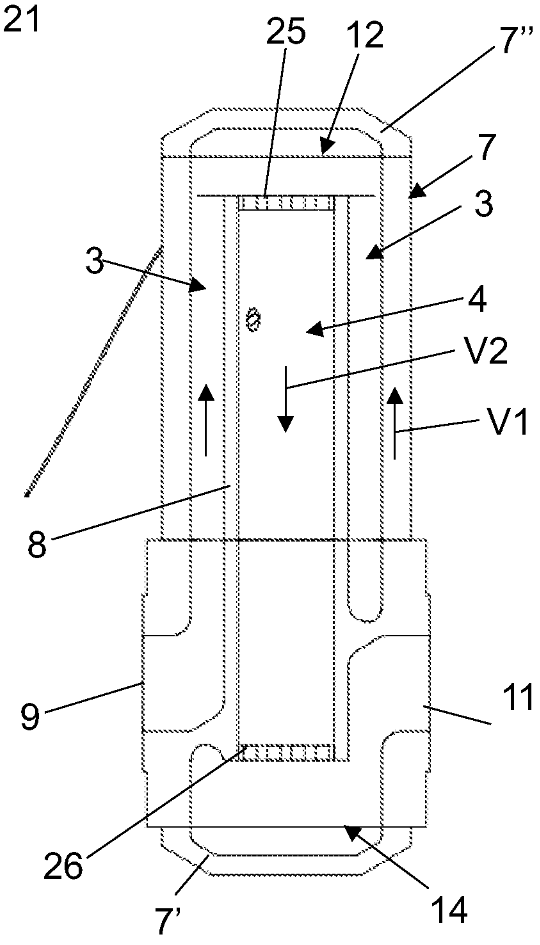
FIG. 6 shows a longitudinal sectional side view of the gas measuring device according to the invention.

The present invention relates to a device for measuring gas which has been identified as a whole with the reference 1 in the attached figures.

Advantageously, the device 1 according to the invention is suitable for use and installed in gas distribution networks, in particular in the distribution networks of natural gas or other gases produced in a decentralized way (such as biomethane or hydrogen), in order to detect the gas flow rate passing through the device itself.

Preferably, the device 1 according to the invention is suitable to be used and installed in correspondence with the final reduction units (GRF) provided in the gas distribution network.

Conveniently, the use of the device 1 for measuring gas is described below, however it is understood that the device 1 according to the invention can also be used for measuring a liquid, for example water.

As can be seen from the figures, the device 1 according to the invention is of the type configured to perform a series of measurements on the gas that passes through said device. Preferably, the device 1 can be of the type generally used as a meter or measurement device for the flow of gas which passes through the section of a pipe on which said device is installed.

In particular, the device 1 according to the invention is configured to be crossed by a flow of gas.

Conveniently, the device 1 can be associated to a gas inlet, for example defined by a pipe section upstream of the device, and to a gas outlet, for example defined by a pipe section downstream of said device.

Conveniently, the device 1 is provided with a containment structure 7 in which the following are defined:

- a first opening 9, which is fluidly in communication with the inlet, to thus allow the gas to enter inside said structure, and a second opening 11, which is fluidly in communication with the outlet, to allow the gas, which has entered/circulated in said structure, to escape from the latter.

Preferably, in correspondence with the first opening 9 and/or the second opening 11, mechanical connection means can be provided, for example flanged portions, with upstream and downstream pipes (not shown) which are external to the device 1.

Preferably, the containment structure 7 is watertight to prevent gas escaping to the outside. Preferably, the containment structure 7 is formed by two or more parts joined together in such a way as to guarantee the airtightness of the entire structure. Preferably, the containment structure 7 is made of metal.

The device 1 for measuring gas according to the invention is in particular of the type suitable for measuring the flow of gas present and circulating inside a pipe.

Figure 11:
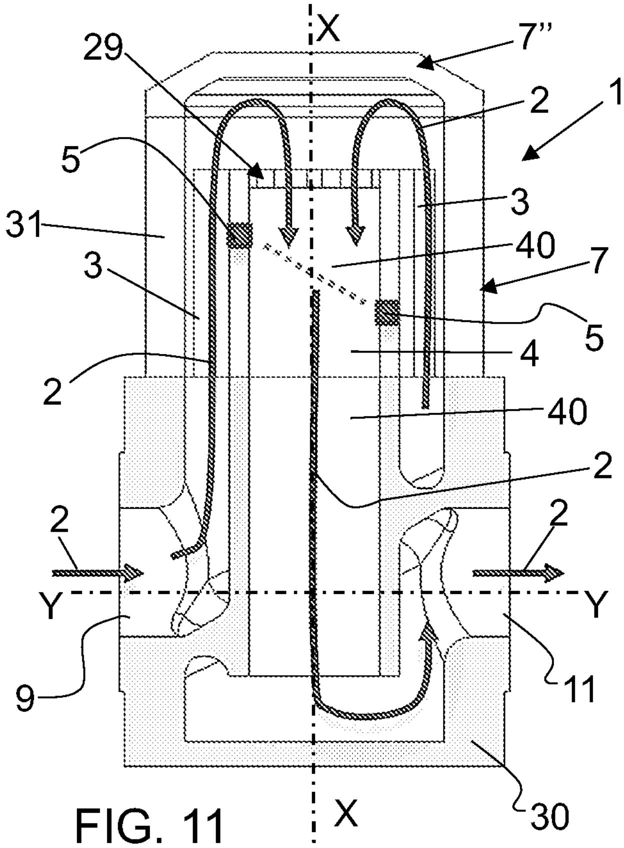
FIG. 11 shows a front view in longitudinal section of a first embodiment of the device for measuring gas according to the invention.

Conveniently, said containment structure 7 internally defines a path 2 for said gas which comprises:

- an internal tubular section 4 which extends along a longitudinal axis X and which is in fluid communication with said first opening 9 for the gas inlet (see FIG. 12), or with said second opening 11 for the gas outlet (see FIG. 11),
- at least one external chamber 3, preferably at least two external chambers 3, which is/are positioned around said tubular section 4 and which is/are in fluid communication with said second opening 11 for the gas outlet (see FIG. 12), or with said first opening 9 for the gas inlet (see FIG. 11).

Conveniently, said at least one external chamber 3 is fluidically connected with the internal tubular section 4 in correspondence with a zone of the latter which is opposite to that in correspondence with which the tubular section itself is in fluid communication with the first opening 9 for the gas inlet, or with the second opening 11 for the gas outlet.

Conveniently, the containment structure 7 extends along a prevalent development axis which corresponds to the longitudinal development axis X of the internal tubular section 4.

Obviously, the device 1 can be installed in the pipeline in such a way that the second opening 11 is configured for the gas inlet and the first opening 9 is configured for the gas outlet, without thereby departing from the scope of protection of this patent.

This patent text has been drawn up with the convention assumed that the gas passes through the device 1 from the first opening 9 to the second opening 11 in an exemplary and non-limiting manner, in order to describe the preferential embodiment solution, however it should be understood that the gas could pass through the device entering the second opening 11 and exiting the first opening 9.

Conveniently, in a possible embodiment not shown, the device 1 can comprise a single chamber 3, preferably having a substantially annular cross section, which is arranged around to the internal tubular section 4, preferably having a cross section which is substantially circular.

Advantageously, the device 1 can comprise two or more chambers 3 that develop externally around the same tubular section 4 and are all in fluid communication with the latter. Conveniently, this allows the gas flow entering or leaving the tubular section 4 to be divided among the various chambers 3. Advantageously, the external chambers 3 extend around the same and only tubular section 4 of said path 2 for said gas. Conveniently, said at least one outer chamber 3 is arranged concentrically around the internal tubular section 4. Conveniently, said at least two or more chambers 3 are circumferentially side by side and are arranged around the same and single tubular section 4.

Preferably, each outer chamber 3 of the gas path 2 inside the structure 7 extends, at least in part, parallel to the internal tubular section 4.

Preferably, the internal tubular section 4 of the gas path 2 inside the structure 7 is substantially straight and develops along the prevailing development axis of the containment structure itself.

Preferably, each external chamber 3 develops externally with respect to the tubular section 4 of the path 2.

Conveniently, the containment structure 7 is configured so that the gas passes through the internal tubular section 4 in a direction of travel V2 which is substantially opposite to the direction distance V1 with which the gas passes through said at least one chamber 3.

Preferably, the tubular section 4 has a substantially circular cross-section. Preferably, the cross section of the internal tubular section 4 is constant along its entire longitudinal extension.

Advantageously, the device 1 comprises sensor means 5 which are mounted inside the structure 7 so as to detect a quantity of the gas flow that crosses the tubular section 4. Preferably, for this purpose, the sensor means 5 are operatively associated with said tubular section 4.

In this way, the gas flow entering the device 1 is forced to cross-upstream (see FIG. 12) or downstream (see FIG. 11) with respect to the crossing of the external chamber 3—the internal tubular section 4 of the gas path 2, which is straight and allows the gas to dissipate any inhomogeneities developed during the inlet of the device 1, thus allowing the sensor means to detect a reliable and highly accurate flow rate value.

Therefore, the device 1 according to the invention obviates the known need to provide long rectilinear distances of the network and piping upstream and/or downstream of the device 1 itself, since the provision of the path 2 inside the structure 7 allows to standardize and homogenize the flow regardless of the geometry of the network in the vicinity of the device 1 itself.

Preferably, the sensor means 5 comprise sensors of the ultrasonic type, in particular for detecting the gas flow rate. Preferably, the sensor means 5 comprise sensors of the static type, of the ultrasonic or thermomassic type.

Preferably, the containment structure 7 comprises a first body 30 in which said first opening 9 and said second opening 11 are formed, and a second body 31—which thus defines or incorporates the measuring module—in which the sensor means 5 are mounted. Preferably, the containment structure 7 is constituted by said first body 30, which is closed at one end by a first lid 32, and by said second body 31, which is closed at one end by a second lid 33.

Preferably the first body 30 is made in a single (first) piece and the second body 31 is made in a single (second) piece.

Preferably, the first body 30 and the second body 31 are made of metallic material.

Conveniently, the first body 30 and the second body 31 can be constituted by corresponding pieces in metallic material (for example obtained by molding), inside which passages for the gas are obtained (in the form of tubular sections or chambers) and a series of cavities or holes for housing various functional components, and in particular for the sensor means 5.

Preferably, the first body 30—in which said first opening 9 and said second opening 11 are formed-defines the connection module of the device 1 with the upstream and downstream pipes (not shown) which are external to the device 1.

Preferably, the second body 31—in which the sensor means 5 are mounted-defines the measurement module of the device 1.

Conveniently, the first body 30—which comprises said first opening 9 and said second opening 11 for connection with the upstream and downstream pipes (not shown) which are external to the device 1—is superimposed on the second body 31 which includes the sensor means 5 (thus defining or incorporating the measuring module). Preferably, the second body 31 is superimposed/aligned with the first body 30 along the development axis X which is perpendicular to the axis Y which passes through the first opening 9 and the second opening 11. Conveniently, the second body 31 is not housed—and in particular it is not entirely housed-inside the first body 30.

Preferably, the second body 31—defining or incorporating the measuring module—is removably associated with the first body 30 which is provided with the first opening 9 and with the second opening 11 and which is intended to be mechanically connected with upstream and downstream pipes (not shown) which are external to the device 1. Preferably, said second body 31—which defines or incorporates the measurement module—is associated with the first body 30 by means of mechanical fixing means of a removable type (for example screws or the like) which, advantageously, can be accessed or activated/activated from the outside of the device 1. This results is advantageous as it allows the measurement module to be removed to perform its calibration (or recalibration) without having to decouple (in particular in correspondence with the flanged portions) the first body 30 from the upstream and downstream pipes, the latter being a particularly long and laborious, especially in the reintegration phase; therefore, in this way, removing only the second body with the measuring module avoids the need to remove and then reinsert the first body between the upstream and downstream pipes; furthermore, advantageously, while the recalibration of the measuring module of the second body which has been removed is being carried out, it is in the meantime possible to mount on the first body a further second body with its own/further measuring module, thus allowing to avoid prolonged interruptions of the operational operation of the device 1.

Conveniently, the second body 31 with the measuring module can be screwed to the first body 30, or vice versa, and/or they can be mechanically connected to each other by means of traditional mechanical fastening members (for example screws or bolts) which pass through one of said bodies engaging in corresponding seats obtained in the other body.

Advantageously, in the area of mutual contact between the two bodies, sealing means can be provided.

Conveniently, the internal tubular section 4 and said at least one external chamber 3 can be obtained both in the first body 30 and in the second body 31. Conveniently, the containment structure 7 can comprise two respective lids 32 and 33 which respectively engage with the first body 30 and with the second body 31 to close the second body 31 at the top so as to define a first manifold 12 and a second manifold 14, as described below in greater detail.

Preferably, said containment structure 7 extends along said prevalent development axis X between a first end 7' and a second end 7", advantageously opposite the first end 7'.

Advantageously, the gas path 2—which is defined inside the containment structure 7—is configured in such a way that in said external chamber 3 the gas is moved in a first direction of travel V1 between said first end 7' and said second end 7" and in said tubular section 4 said gas is moved in a second direction of travel V2 substantially opposite to said first direction of travel V1.

Figure 7:
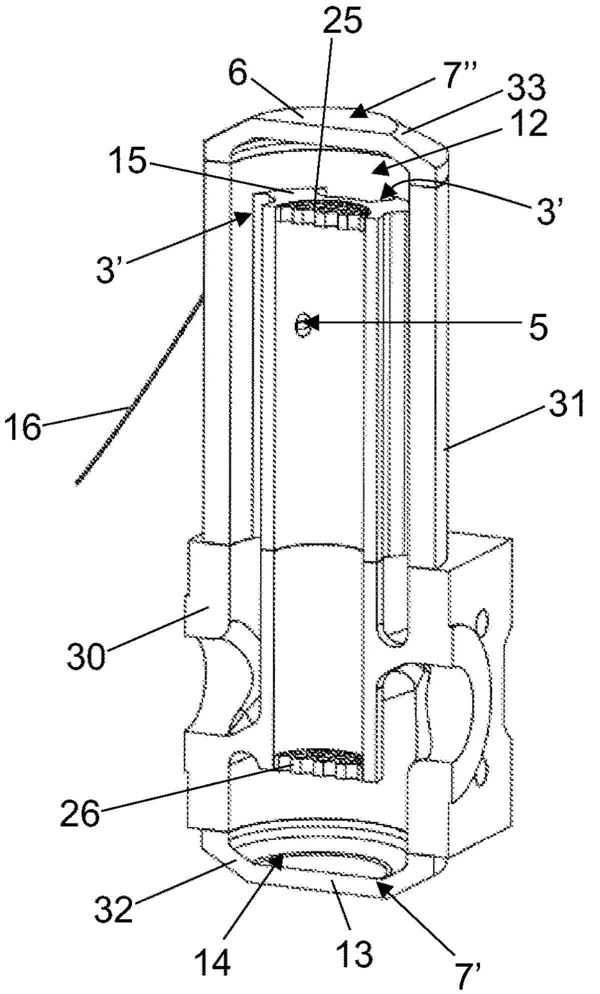
FIG. 7 shows a longitudinal sectional side perspective view of the gas measuring device according to the invention.
Figure 8:
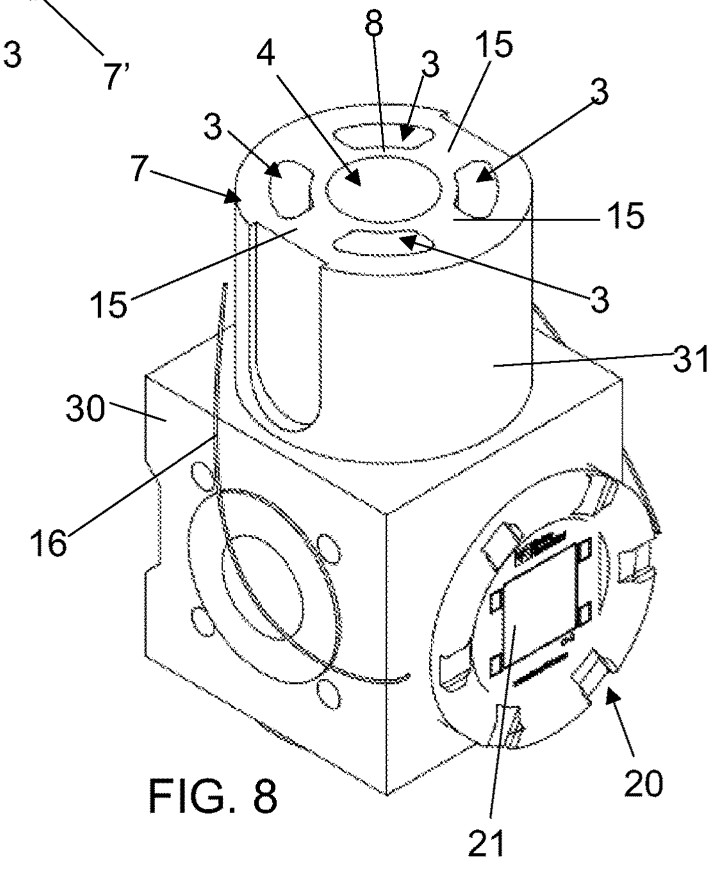
FIG. 8 shows a sectional perspective view of the second device made along a horizontal section line.
Figure 9:
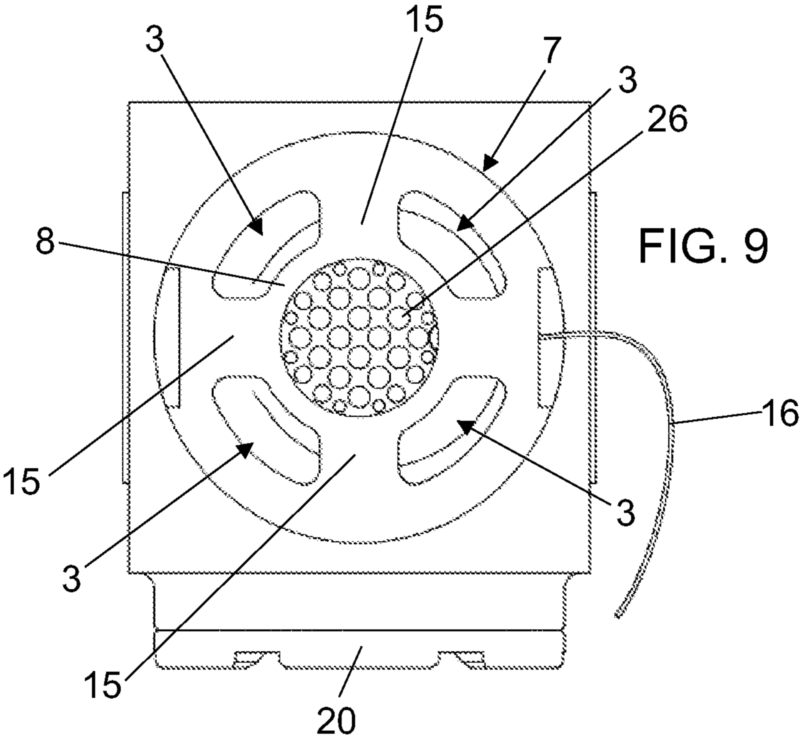
FIG. 9 shows a top view of the device in the sectional view of FIG. 8.
Figure 10:
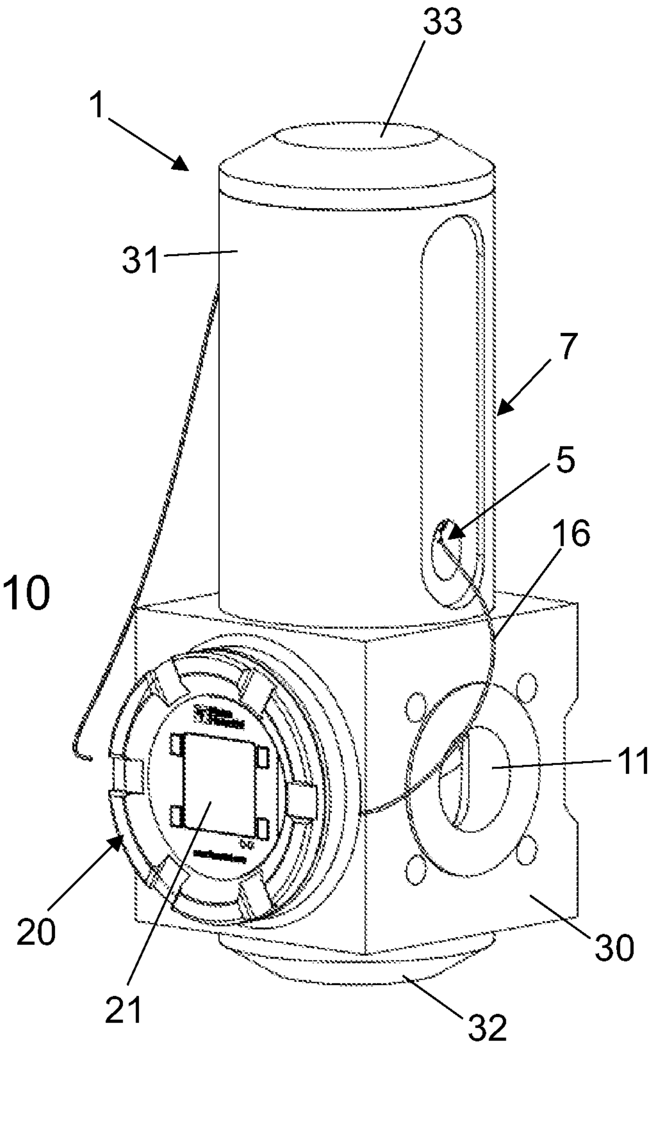
FIG. 10 shows a perspective view of the device according to the invention.

In accordance with a possible embodiment (see FIG. 7), the first direction V1 of the gas in the external chamber 3 faces from the first end 7' towards the second end 7" of the containment structure 7 while the second direction of travel V2 of the gas in the tubular section 4 faces from the second end 7" towards the first end 7'.

Advantageously, said first opening 9 is formed near said first end 7' of said containment structure 7 and the chamber 3 of said path 2 extends between said first opening 9 and a bottom wall 6 provided near said second end 7".

Advantageously, said containment structure 7 comprises an internal wall 8, substantially tubular in shape, which extends along the longitudinal development axis X and which internally defines said tubular section 4 of said path 2 for said gas.

Preferably, said internal wall 8 extends around the longitudinal development axis X which passes through the center of the tubular section 4.

Advantageously, said tubular section 4 of said path 2 extends between a third opening 4' of said internal wall 8, provided facing said bottom wall 6, and a fourth opening 4" of said internal wall 8, opposite said third opening 4' and placed in fluid connection with said second opening 11.

Advantageously, the tubular section 4 remains defined between the third opening 4' and the fourth opening 4" of the internal wall 8.

Advantageously, the device 1 comprises, inside the containment structure 7, means 29 for conditioning the flow of gas along the path 2 defined inside the containment structure 7.

Conveniently, said means 29 for conditioning the flow comprise at least one upstream flow conditioner 25 and/or at least one downstream flow conditioner 26, positioned upstream and downstream with respect to the sensor means 5, respectively.

Advantageously, the device 1 comprises at least one upstream flow conditioner 25 which is positioned in correspondence with the upstream tubular section 4 (according to the direction in which the gas flows inside the tubular section 4) with respect to the sensor means 5. Preferably, said at least one upstream flow conditioner 25 can be mounted at the inlet of the tubular section 4.

Preferably, said at least one upstream flow conditioner 25—which is precisely positioned upstream with respect to the sensor means 5—it can be mounted inside the internal tubular section 4 and/or it can be mounted externally around the internal tubular section 4.

Preferably, said at least one upstream flow conditioner 25—which is precisely positioned upstream with respect to the sensor means 5—it can be mounted inside the internal tubular section 4 in correspondence with the inlet mouth of said internal tubular section element 4 and/or in correspondence of a more internal position with respect to the inlet mouth of said tubular section (but always upstream with respect to the sensor means 5).

Figure 16:
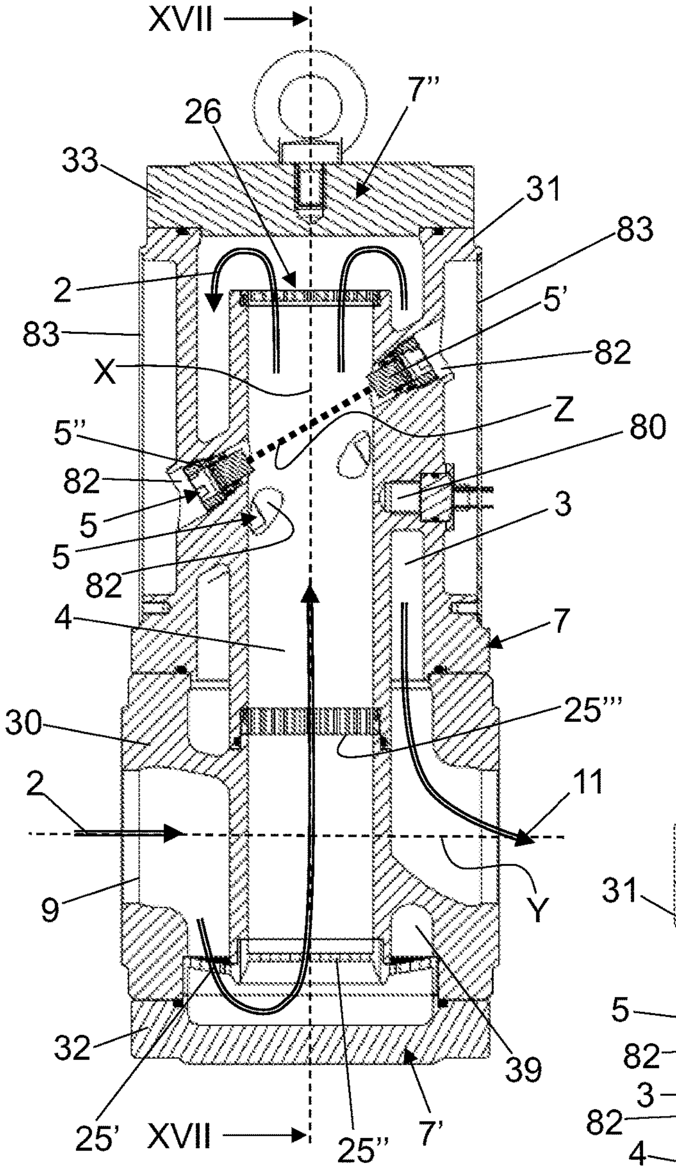
FIG. 16 shows the device according to section XVI-XVI of FIG. 15.
Figure 17:
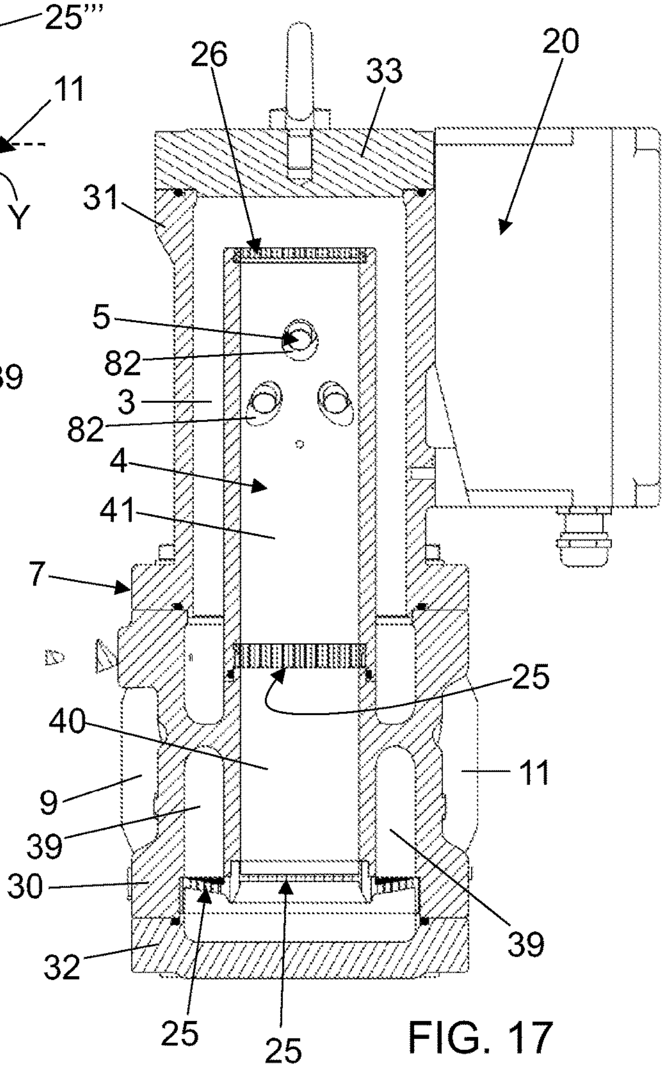
FIG. 17 shows the device according to section XVII-XVII of FIG. 16.

Advantageously, in the embodiment shown in FIGS. 16 and 17, three upstream flow conditioners 25 are provided (all positioned upstream with respect to the sensor means 5) and, in particular, a first upstream flow conditioner 25' is provided externally around the internal tubular section 4, a second upstream flow conditioner 25", which is mounted inside the internal tubular section 4 at its inlet, and a third upstream flow conditioner 25" which is mounted inside the internal tubular section 4 in a more internal position with respect to the inlet mouth of the section itself.

Preferably, the first upstream flow conditioner 25' to be mounted externally around the tubular section 4 and the second upstream flow conditioner 25" to be mounted inside the tubular section 4, and both in correspondence with the inlet, can be made in a single piece which, advantageously, can be configured to be held between the inlet of the tubular section 4 and the walls that delimit the internal passages/chambers of the body 30 and/or the lid 32.

Preferably, said upstream flow conditioner 25 can be provided in correspondence with the third opening 4' and, in particular, it can be placed to intercept the gas passing through the third opening 4' and in particular at the inlet to the tubular section 4 of path 2.

Advantageously, the device 1 comprises at least one downstream flow conditioner 26 which is positioned in correspondence with the downstream tubular section 4 (according to the direction in which the gas flows inside the tubular section 4) with respect to the sensor means 5. Preferably, said at least one downstream flow conditioner 26 is mounted at the outlet of the tubular section 4.

Preferably, the device 1 comprises, at the fourth opening 4", a downstream flow conditioner 26, placed to intercept the gas passing through the fourth opening 4" and in particular outgoing from the tubular section 4 of path 2.

Advantageously, the upstream flow conditioner 25 and/or downstream 26 comprises a plurality of through holes, designed to allow the passage of said gas and at the same time to uniform the flow respectively at the inlet and/or outlet in/from the tubular section 4 of path 2,

- a flow conditioner can be provided (for example the upstream flow conditioner 25") which is positioned inside the tubular section 4 in correspondence with a central area of the latter, in particular in correspondence with an area between the inlet and the outlet of the tubular section itself.

Therefore, advantageously, the joint action of the linearity of the tubular section 4 of the path 2 for the gas and the provision of at least one flow conditioner 25 and/or 26 allows to ensure a homogeneity and uniformity of the gas flow that passes in the tubular section 4, ie in front of the sensor means 5, thus ensuring a high measurement accuracy, in particular of the flow rate.

Conveniently, a first manifold 12 remains defined between the bottom wall 6 and the third opening 4', configured to receive the gas leaving each chamber 3 of the path 2 and channel it towards the tubular section 4 of the path itself.

Advantageously, the first manifold 12 is configured to cause a deviation of the gas flow of about 180° in the passage between each chamber 3 and the internal tubular section 2.

Conveniently, the concentric arrangement of at least one chamber 3 around the straight longitudinal axis X of the internal tubular section 4 allows to decouple/separate the flow that crosses the chamber 3 from that which crosses the straight internal tubular section 4 and this without providing for the need to use U-shaped tubular fittings and also eliminating the disturbances caused by the curved sections that, in traditional solutions, are positioned upstream of the measuring devices.

Conveniently, the concentric arrangement of two or more chambers 3 around the rectilinear longitudinal axis X of the internal tubular section 4 allows to divide the gas flows upstream or downstream of said internal tubular section 4.

Conveniently, between a second bottom wall 13, provided at the first end 7' of the containment structure 7, and the fourth opening 4" is defined as a second manifold 14 configured to receive the gas leaving the tubular section 4 of the path 2 and channel it towards the second opening 11 of the containment structure 7, and from here towards the downstream pipe in which the device 1 is installed.

Advantageously, each chamber 3 remains defined between said internal wall 8 and an internal surface of said containment structure 7. Preferably, the internal surface of said containment structure 7 is advantageously substantially cylindrical.

Conveniently, the internal wall 8 is equipped externally with ribs 15, which protrude towards the internal surface of the containment structure 7 to thus define two or more chambers 3 which develop parallel to each other and to the prevailing development axis X. Therefore, each chamber 3 of the path 2 remains defined between the ribs 15 and the internal surface of the containment structure 7.

Advantageously, in a possible embodiment, the gas path 2 inside the device 1, and in particular inside of the containment structure 7, can first foresee the subdivision of the inlet flow into several sub-flows which cross the respective external chambers 3 and, subsequently, the meeting of the sub-flows divided into a single flow for the crossing of the internal tubular section 4 (see FIG. 11).

Figure 12:
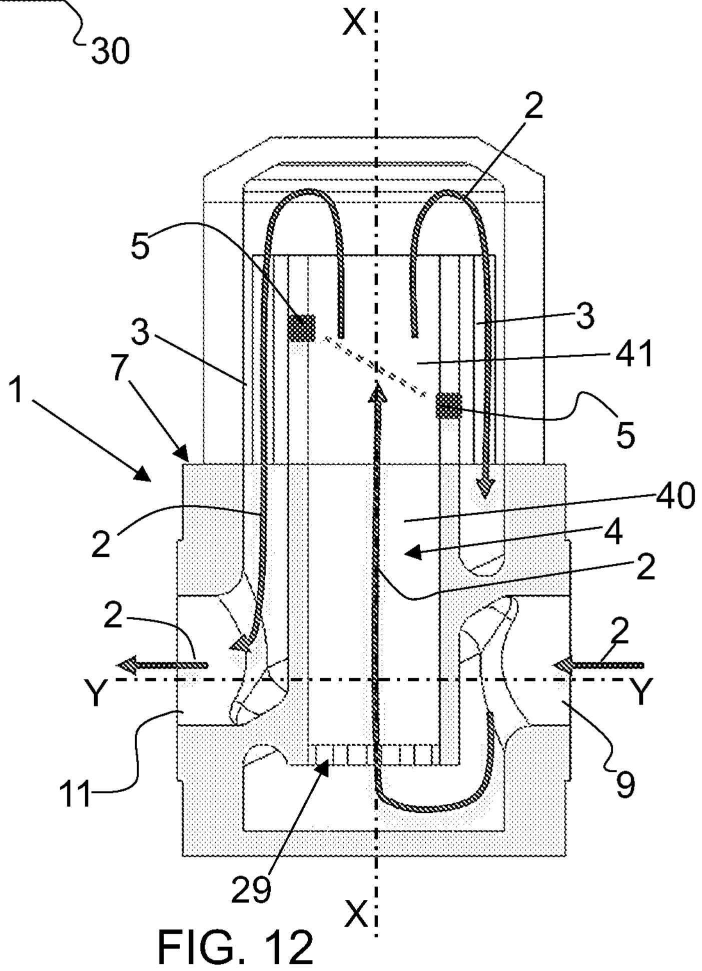
FIG. 12 shows a front view in longitudinal section of a second embodiment of the device according to the invention.

Advantageously, in a possible embodiment, the path 2 of the gas inside the device 1, and in particular inside the containment structure 7, can first foresee the crossing of the internal tubular section 4 and subsequently the subdivision of the flow in various sub-flows that pass through respective external chambers 3, to then reunite again in a single flow to come out through the second opening 11 (see FIG. 12).

Preferably, in a possible embodiment (see FIGS. 12-17), the external chamber 3 is in direct fluidic connection with the second opening 11 for the gas outlet.

Preferably, in a possible embodiment (see FIGS. 12-17), the inlet/upstream port of the tubular section 4 is in fluidic connection with the first opening 9 for the gas inlet, while the outlet/downstream of the tubular section 4 it is in fluidic connection with the external chamber 3 which is then in direct fluidic connection with the second opening 11 for the gas outlet. Therefore, the path 2 of the gas that enters the device 1 from the first opening 9 first passes through the tubular section 4 and then the external chamber 3, to exit the device 1 at the second opening 11.

Conveniently, the external chamber 3 is obtained/defined at least partially in the second body 31. Conveniently, the outer chamber 3 can be obtained/partially defined also in the first body 30.

Conveniently, the internal tubular section 4 with substantially straight development along the X axis is partially obtained/defined in the first body 30 and partly in the second body 31. Preferably, the internal tubular section 4 comprises a first part 40 which is defined and/or formed in said first body 30 and a second part 41 which is defined and/or formed in said second body 31, and in which said first part 40 and said second part 41 are coaxial and consecutive to each other.

Preferably, at least a part of the internal tubular section 4 is formed in the first body 30, i.e. in the same body which also comprises the first opening 9 and the second opening 11. Conveniently, said at least a part of the internal tubular section 4 which is formed in the first body 30 is upstream with respect to the sensor means 5.

Advantageously, this allows for a greater longitudinal development of the internal tubular section 4, thus allowing a better linearization of the gas flow before it meets the sensor means 5. In other words, this it allows to have a longer straight portion before the gas reaches the sensor means 5, thus linearizing the gas flow, and at the same time it allows to keep the overall dimensions of the device 1 limited.

Preferably, in a possible embodiment (cf. FIGS. 12-17), the first opening 9 for the gas inlet is in fluidic connection with the inlet/upstream mouth of the tubular section 4 by means of a further external annular chamber 39 which is entirely formed only in the first body 30. Preferably, the first upstream flow conditioner 25' is housed inside said further external annular chamber 39 around the tubular section 4. Advantageously, said sensor means 5 comprise at least one ultrasonic emitter 5' mechanically mounted on an internal wall 8 of said containment structure 7, which internally defines said tubular section 4 of said path 2 for said gas, configured to generate at least one ultrasonic signal inside said tubular section 4, along a detection direction Z, angled with respect to said prevailing development axis X.

Conveniently, the ultrasonic sensor means 5 are mounted so that the ultrasonic signal crosses the tubular section 4 along a direction which is angled with respect to the direction of longitudinal development X of the tubular section 4 and, in particular, is angled with respect to the direction of crossing/advancement of the gas inside the tubular section 4.

Conveniently, the sensor means 5 comprise at least one ultrasonic receiver 5", mechanically mounted on said internal wall 8, aligned with said ultrasonic emitter 5' along said direction of Z detection and configured to receive said ultrasonic signal.

Conveniently, said at least one ultrasonic emitter 5' and said at least one ultrasonic receiver 5" are mounted on corresponding diametrically opposite areas of the tubular section 4. Conveniently, said at least one ultrasonic emitter 5' and ultrasonic receiver 5" comprise at least one ultrasonic transducer.

Advantageously, the sensor means 5 can comprise at least two pairs of ultrasonic emitters 5'-ultrasonic receivers 5", preferably three pairs of ultrasonic emitters 5'-ultrasonic receivers 5" (see FIGS. 15 and 17).

Preferably, the sensor means 5 are mounted in corresponding through seats 82 obtained in the containment structure 7—and in particular on the second body 31 of the containment structure 7—so as to pass through the external annular chamber 3 until reaching the inside of the tubular section 4, to thus measure the gas that/when it passes through said tubular section 4. Furthermore, the through seats 82 for the sensor means 5 are closed from the outside by a covering element 83 which is configured to be associated in a mechanically removable way (for example by interlocking, form coupling, snap-fit or similar connections) to the second body 31 of the containment structure 7. Preferably, a first covering element 83 is provided to close the through seats 82 for a first group of sensors 5' and a second covering element 83 to close the through seats 82 for a second group of sensors 5". Advantageously, the removability of the covering element 83 allows easy and rapid access from the outside to the sensor means 5 in order to be able to carry out their removal and/or replacement.

In a possible embodiment, not shown here, at least one reflector configured to reflect the ultrasonic signal emitted by the emitter 5' towards the receiver 5' can be provided. Conveniently, in this case, the emitter 5', the receiver 5" and the reflectors are mounted inside the tubular section so as to define a "V" or "W" path for the ultrasonic signal.

Advantageously, the emitter 5' and the receiver 5" of the sensor means 5 are placed to cross the internal wall 8 and protrude inside the tubular section 4 of the path 2 with a corresponding working surface.

Preferably, the emitter 5' and the receiver 5" of the sensor means 5 are inserted in seats obtained inside the ribs 15 and are connected to electrical connection means 16, such as in particular electric cables, which suitably protrude externally from the containment structure 7.

Preferably, said first opening 9 and said second opening 11 are mutually aligned along a direction Y which is transversal with respect to the longitudinal axis X of the internal tubular section 4. Preferably, between the openings 9 and 11 is interposed said inner wall 8 defining inside it said tubular section 4 of said path 2 for said gas.

In this way, the only encumbrance of the device 1 inside the pipe is that of the linear distance (defined as "gauge") between the first opening 9 and the second opening 11, along the transverse direction Y, since the internal tubular section 4 and said at least one chamber 3 which-together define the path 2 for the gas inside the structure 7—develop along the X axis, which is substantially perpendicular to the transverse direction Y, allowing in fact to install the device according to the invention in any position of the pipe in which at least the aforementioned linear distance is available between the first opening 9 and the second opening 11.

Advantageously, the device 1 comprises a processing and/or control unit (not illustrated in the attached figures) which, preferably, is defined by an electronic board equipped with a microprocessor or a microcontroller. Conveniently, the sensor means 5 can be of the electronic type and be provided with their own electronic card or be associated with a common electronic card (for example defined by the processing unit) associated with the structure 7.

Advantageously, the device 1 can also comprise a pressure sensor 80 operationally mounted on the structure 7 (preferably on the second body 31) so as to measure the pressure of the gas that crosses the internal tubular section 4. Advantageously, this allows greater precision in the subsequent conversion of the flow rate detected by the sensor means 5 to the reference thermodynamic conditions.

Advantageously, the device 1 can comprise at least one temperature sensor 81 operationally mounted on the structure 7 (preferably on the second body 31) so as to measure the temperature of the gas that crosses the internal tubular section 4 and/or that crosses the external annular chamber 3.

Advantageously, the device 1 also comprises at least one memory unit. Conveniently, this at least one memory unit is defined by an electronic board which houses a memory, preferably non-volatile, for example a ROM or EPROM or EEPROM or flash memory, or also volatile, for example RAM. Advantageously, said at least memory unit can be housed inside the structure 7, but it could also be housed outside the structure 7.

Preferably, the device 1 comprises an external module 20 which is positioned externally to the structure 7 and, preferably, it is associated with the external surface of a wall of said structure. Conveniently, the external module 20 is housed inside a second casing, preferably made of plastic.

Conveniently, the external module 20 comprises its own processing and/or control unit which, preferably, is defined by an electronic board (for example a printed circuit PCB) in which a microprocessor or a microcontroller is housed. In particular, the external module 20 is configured to receive the readings made by the sensor means 5 and, in particular, to receive electrical signals (preferably digital) representative of the quantities detected by the sensor means 5.

Advantageously, the external module 20 also comprises a user interface 21—for example a push-button panel associated with a visualization screen or a display, for example of the touch-screen type-configured to allow the user to interact with the external module 20. Conveniently, the data received is shown on the display and/or processed by said external module 20.

Advantageously, the external module 20 is electrically connected to the sensor means 5 by means of the aforementioned electrical connection means 16, in particular by means of electric cables placed through the containment structure 7.

Advantageously, the external module 20 also comprises remote communication means, preferably transmission or transceiver means with a possible remote unit. Conveniently, said transmission or transceiver means can be of the wireless type (in particular via infrared or via radio, for example Wi-Fi). Conveniently, these transmission or transceiver means can be connected and/or integrated into the electronic card of the external module 20. Preferably, the communication means can be configured to allow the device 1 to interact and exchange data and/or information and/or commands with an external portable device (not shown), such as a smartphone or tablet. Advantageously, the communication means can be configured to allow the device 1 to interact and exchange data and/or information and/or commands with an external processing unit. Preferably, the external processing unit can define an external (remote) central unit which is configured to receive information from one or more devices 1.

Conveniently, the electrical connection means 16 comprise for example an electrical signal transmission cable, preferably a flat cable of the "FFC" type. Conveniently, the electric cable can pass from the inside to the outside of said structure 7 in correspondence with a passage opening, suitably sealed, provided for housing the sensor means 5.

Advantageously, the external module 20 also comprises inside it at least one source of electrical energy for the components of the external module 20 itself (ie both for the external electronic unit and/or the means of remote communication) and for the components of the first module (in particular for the sensor(s)). Preferably, said at least source of electrical energy comprises at least an accumulation unit (battery or cell) which is connected directly or by means of the electronic card to the various components of the external module 20 in order to supply the electrical energy for their operation.

The memory unit is independent and external with respect to the structure of said external module 20 and, suitably, cannot be removed together with the latter.

Advantageously, said at least the memory unit is configured to store a plurality of information relating to the manufacturing characteristics of the device 1 and its operation.

Advantageously, as mentioned, access to the memory unit is prevented by one or more seals which must necessarily be tampered with in order to access the memory unit itself. In this way, therefore, any intervention, tampering or removal of the memory unit can be suitably and immediately identified. Preferably, said seals can comprise adhesive portions, padlocks, threads, or any other means that is suitable for the purpose.

Conveniently, therefore, once the device 1 has been constructed and metrologically sealed, the memory unit is protected and cannot be altered.

From what has been said it is clear that the device 1 according to the invention is more advantageous than the traditional devices in that:

it can be installed in any section of a gas distribution network, in particular in correspondence with the final reduction units;

it does not require straight sections upstream and/or downstream of the device itself;

has a small footprint;

obviates the need to modify the geometry of the distribution network for its installation;

meets the regulatory requirements for measurement accuracy, in particular for gas flow;

it is structurally and functionally completely reliable;

it is an improvement and/or alternative to traditional ones;

has high safety and operability standards;

it can be created simply, quickly and at low costs;

it presents an alternative characterization, both in constructive and functional terms, compared to the traditional ones.

The present invention has been illustrated and described in a preferred embodiment thereof, but it is understood that executive variations may be applied to it in practice, without however departing from the scope of protection of the present patent for industrial invention.

The invention claimed is:

1. Device for measuring a fluid, the device configured to measure a flow rate of gas or liquid circulating within a pipe and through the device, the device comprising:

a containment structure which is provided with a first opening for the inlet of the fluid therein and with a second opening for the outlet of the fluid, said containment structure being configured to define inside it a path for the fluid between said first opening and said second opening, said path comprising:

an internal tubular section which extends in a substantially rectilinear way along a longitudinal axis X and which is in direct fluid communication with said first opening for the inlet of the fluid, at least two external chambers for subdividing the fluid flow, which are positioned around said tubular section and which are in fluid communication with said second opening for the outlet of the fluid, so that the fluid flow first passes through said internal tubular section and then said at least two external chambers, said at least two external chambers being fluidly connected with said internal tubular section in correspondence with an area of the internal tubular section which is opposite to that in correspondence with which said tubular section is in fluid communication with said first opening for the fluid inlet, sensor means configured to detect a quantity of the flow of said fluid that passes through said internal tubular section, wherein said containment structure comprises:

a first body in which said first opening and said second opening are formed and which is configured to be mechanically connected between an upstream pipe and a downstream pipe that are external to said device, a second body in which said sensor means are mounted, and wherein:

said internal tubular section which extends substantially rectilinearly along the longitudinal axis X is defined and/or formed partly in said first body and partly in said second body, said at least two external chambers being defined and/or formed, at least in part, in said second body, said sensor means comprise at least one ultrasonic emitter and at least one ultrasonic receiver mechanically mounted on a wall which internally delimits said internal tubular section, the internal wall is equipped externally with ribs, which protrude towards an internal surface of the containment structure to thus define said at least two external chambers which extend parallel to each other and to the prevailing longitudinal axis X, the at least one ultrasonic emitter and the at least one ultrasonic receiver of the sensor means are inserted in seats obtained inside the ribs and are connected to electrical connection means which protrude externally from the containment structure.

2. The device according to claim 1, wherein said at least two external chamber extend, at least in part, externally around the internal tubular section and parallel with respect to said longitudinal axis of the internal tubular section.

3. The device according to claim 1, wherein said containment structure is configured so that the fluid passes through the internal tubular section in a direction of travel which is substantially opposite to the direction of travel with which the fluid passes through said at least two external chambers.

4. The device according to claim 1, wherein said first inlet opening is in direct fluidic communication with said at least two external chambers while said second outlet opening is in direct fluidic communication with the internal tubular section, so that the flow of fluid first passes through said at least one external chamber and then said internal tubular section.

5. The device according to claim 1, further comprising, inside the containment structure, means for conditioning the flow of the fluid along the path defined inside the containment structure.

6. The device according to claim 5, wherein said means for conditioning the flow of the fluid comprise at least one upstream flow conditioner which is mounted in correspondence with the internal tubular section upstream of the sensor means.

7. The device according to claim 1, further comprising at least one upstream flow conditioner which is mounted externally around the internal tubular section, at the inlet of said internal tubular section.

8. The device according to claim 1, further comprising at least one upstream flow conditioner which is mounted inside the internal tubular section.

9. The device according to claim 1, wherein said sensor means are of the ultrasonic type and are mounted on said second body so that the ultrasonic signal passes through the tubular section along a direction which is angled with respect to the longitudinal axis X of the tubular section.

10. The device according to claim 1, wherein said at least one ultrasonic emitter is configured to generate at least one ultrasonic signal inside said internal tubular section, along a detection direction, angled with respect to the longitudinal axis of the internal tubular section.

11. The device according to claim 1, wherein-said at least one part of the tubular section, which is obtained and/or defined in said first body, is positioned upstream with respect to the sensor means.

12. The device according to claim 1, wherein said at least two external chambers are also obtained and/or defined, at least in part, in said first body.

13. The device according to claim 1, wherein said second body is mechanically associated in a removable way to said first body.

14. The device according to claim 1, wherein said internal tubular section comprises a first part which is defined and/or formed in said first body and a second part which is defined in said second body, said first part and said second part being coaxial and consecutive to each other.

15. The device according to claim 1, wherein said first opening for the gas inlet is in fluidic connection with an inlet/upstream mouth of the tubular section by means of a further external annular chamber.

16. The device according to claim 15, wherein said further external annular chamber is entirely formed only in the first body.

17. The device according to claim 15, wherein at least one upstream flow conditioner is housed in said further external annular chamber.

* * * * *